(12) United States Patent
Manohar et al.

(10) Patent No.: US 12,255,811 B2
(45) Date of Patent: Mar. 18, 2025

(54) FALLBACK-AWARE POLICY-BASED ROUTING

(71) Applicant: Nutanix, Inc., San Jose, CA (US)

(72) Inventors: Mary Preeti Manohar, Los Gatos, CA (US); Sragdhara Datta Chaudhuri, Cupertino, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/228,535

(22) Filed: Jul. 31, 2023

(65) Prior Publication Data
US 2025/0047594 A1    Feb. 6, 2025

(51) Int. Cl.
*H04L 45/42* (2022.01)
*H04L 45/00* (2022.01)

(52) U.S. Cl.
CPC .............. *H04L 45/42* (2013.01); *H04L 45/22* (2013.01); *H04L 45/566* (2013.01)

(58) Field of Classification Search
CPC ........ H04L 45/42; H04L 45/22; H04L 45/566
See application file for complete search history.

(56) References Cited

U.S. PATENT DOCUMENTS

| | | | |
|---|---|---|---|
| 7,877,505 B1 * | 1/2011 | Oz | .......................... H04L 12/66 709/200 |
| 8,549,518 B1 | 10/2013 | Aron et al. | |
| 8,601,473 B1 | 12/2013 | Aron et al. | |
| 8,850,130 B1 | 9/2014 | Aron et al. | |
| 9,264,400 B1 * | 2/2016 | Lin | .......................... H04L 49/30 |
| 9,772,866 B1 | 9/2017 | Aron et al. | |
| 2003/0097557 A1 * | 5/2003 | Tarquini | .................. G06F 21/55 713/153 |
| 2016/0294677 A1 * | 10/2016 | Kazerani | ............... H04L 45/247 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Glenton B Burgess
*Assistant Examiner* — Jihad K Boustany
(74) *Attorney, Agent, or Firm* — Vista IP Law Group, LLP

(57) ABSTRACT

Methods, systems, and computer program products for computer networking. Legacy policy-based routing is advanced by adding fallback-aware policy actions that are enabled within a policy-based routing regime. Upon determining that a destination specified in a subject policy is compromised, or down, or unreachable then, a fallback-aware policy action is invoked. Destinations specified in policies may refer to inserted services, wherein an inserted service can be any one of, a service process, a service virtual machine, a hardware network component, or a virtual network interface. Such inserted services might implement a logging service, or a firewall service, or other services that can process a network packet. Fallback-aware policy actions include, a PASSTHROUGH fallback action, an ALLOW fallback action, a FORWARD fallback action, and a DROP fallback action. Various techniques serve to determine whether or not a particular destination of a subject policy is deemed to be compromised, or down or unreachable.

24 Claims, 11 Drawing Sheets

(56) References Cited

U.S. PATENT DOCUMENTS

| | | | |
|---|---|---|---|
| 2018/0262454 A1* | 9/2018 | Zandi | H04L 51/214 |
| 2020/0076734 A1* | 3/2020 | Naveen | H04L 41/40 |
| 2023/0269128 A1* | 8/2023 | Mullis | H04L 12/1863 370/216 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jul. 9, 2019), from htisxbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 30, 2021), from https://nutanixbible.com/ (Publication date based on indicated capture date by Archive.org; first publication date unknown).

Poitras, Steven. "The Nutanix Bible" (Sep. 9, 2022), from https://nutanixbible.com/ (Publication date based on indicated capture date by Archive.org; first publication date unknown).

Cano, I. et al., "Curator: Self-Managing Storage for Enterprise Clusters", *14th USENIX Symposium on Networked Systems Design and Implementation, NSDI '17*, (Mar. 27, 2017).

"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.

Joseph, D., et al., "A Policy-aware Switching Layer for Data Centers," University of California at Berkeley, SIGCOMM'08, Aug. 17-22, 2008.

"Chapter 26: Configuring Policy-Based Routing," Cisco Software Configuration Guide—Release 12.2(25)EW, date found via Google as Mar. 21, 2015.

Katsikogiannis, G., et al., "Policy-Based QoS Management for SLA-Driven Adaptive Routing," Department of Informatics, University of Piraeus, Journal of Communications and Networks, Jun. 2013.

Katsikogiannis, G., et al., "A PBNM System for adaptive routing," Department of Informatics, University of Piraeus, dated Sep. 2011.

Al-Madi, M., et al., "A Proposed Model for Policy-Based Routing Rules in the IPV6 Offering QoS for IPTV Broadcasting," IJCSNS International Journal of Computer Science and Network Security, vol. 8 No. 3, Mar. 2008.

\* cited by examiner

| Fallback Action Options | Fallback Action Semantics |
|---|---|
| PASSTHROUGH | Deactivate current rule |
| DROP | Drop the packet |
| ALLOW | Route the packet (even though the service is down) |
| FORWARD | Route the packet to the destination given in the packet |

FALLBACK-AWARE POLICY-BASED ROUTING

TECHNICAL FIELD

This disclosure relates to computer networking, and more particularly to techniques for fallback-aware policy-based routing.

BACKGROUND

Policy-based routing (PBR) is a technique that forwards and routes data packets based on pre-established policies or filters. Network administrators can define and selectively enable/disable policies based on specific parameters such as source and destination IP address, source or destination port, traffic type, protocols, access list, packet size, and/or other criteria. When a packet arrives at a route point, if the packet is deemed to be subject to an enabled policy, the routing function will route the packet based on logic-determined routes that are determined based on matching criteria and corresponding actions. For example, if a packet's destination address matches a logical expression in an enabled policy, then the predefined parameters of the enabled policy are checked for applicability. In exemplary cases, if one of the predefined parameters of the enabled policy includes an alternate destination address, then the destination address of the packet is modified to refer to the alternate destination address and the packet is routed accordingly.

The goal of PBR is to make the network as agile as possible. That is, by defining routing behavior based on application attributes, PBR provides flexible, granular traffic-handling capabilities for forwarding packets.

By using PBR, network administrators can achieve a variety of objectives. For example, one exemplary use-case for PBR is to insert any one or more arbitrary network functions in the path of traffic between two endpoints. In certain cases, the network function that was inserted in the path helps to achieve optimal bandwidth utilization by filtering out certain kinds of traffic before it reaches the destination. In other use-cases, the inserted network function is configured to facilitate performance of actions such as logging, security hardening, breach detection and other security-related functions, load balancing etc.

Unfortunately, legacy policy-based routing is unaware of the functionality and/or health of whatever computing elements are associated with the inserted functions(s). As such, packets that are re-routed to an alternate destination under a legacy PBR policy might end up being unwantedly dropped (e.g., due to a timeout). This is a deficiency in legacy PBR, at least in that merely dropping packets due to the unavailability of the computing element associated with the alternate destination is a one-size-fits-all approach that unfortunately does not apply to all situations.

What is needed is a way to offer the network administrator and/or the configuration agents more options for defining PBR policies. The problem to be solved is therefore rooted in various technological limitations of legacy approaches. Improved technologies are needed. In particular, improved applications of technologies are needed to address the aforementioned technological limitations of legacy approaches.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and computer program products for fallback-aware policy-based routing, which techniques advance the relevant technologies to address technological issues with legacy approaches. More specifically, the present disclosure describes techniques used in systems, methods, and in computer program products for policy-based routing with fallback action options. Certain embodiments are directed to technological solutions for specifying and carrying out policy actions that address fallback situations.

The disclosed embodiments modify and improve beyond legacy approaches. In particular, the herein-disclosed techniques provide technical solutions that address the technical problems that arise in the face of a dearth of policy action options when specifying policy-based routing actions. Such technical solutions involve specific implementations (e.g., data organization, data communication paths, module-to-module interrelationships, etc.) that relate to the software arts for improving computer functionality. Various applications of the herein-disclosed improvements in computer functionality serve to reduce demand for computer memory, reduce demand for computer processing power, reduce network bandwidth usage, and reduce demand for intercomponent communication.

For example, when performing computer operations that address the various technical problems that are exposed due to when there is a dearth of policy action options when specifying policy-based routing actions, both memory usage and CPU cycles demanded are significantly reduced as compared to the memory usage and CPU cycles that would be needed but for practice of the herein-disclosed techniques. Strictly as one case, the data structures as disclosed herein and their use serve to reduce both CPU cycles and networking bandwidth as compared to legacy approaches.

The ordered combination of steps of the embodiments serve in the context of practical applications that perform steps for specifying and carrying out policy actions that address fallback situations more efficiently by avoiding packet resending and management during timeout periods. As such, techniques for specifying and carrying out policy actions that address fallback situations overcome long-standing yet heretofore unsolved technological problems associated with the need to codify policy action options.

Many of the herein-disclosed embodiments for specifying and carrying out policy actions that address fallback situations are technological solutions pertaining to technological problems that arise in the hardware and software arts that underlie computer-to-computer communications. Aspects of the present disclosure achieve performance and other improvements in peripheral technical fields including, but not limited to, high performance computing and virtualized computing cluster management.

Some embodiments include a sequence of instructions that are stored on a non-transitory computer readable medium. Such a sequence of instructions, when stored in memory and executed by one or more processors, causes the one or more processors to perform a set of acts for specifying and carrying out policy actions that address fallback situations.

Some embodiments include the aforementioned sequence of instructions that are stored in a memory, which memory is interfaced to one or more processors such that the one or more processors can execute the sequence of instructions to cause the one or more processors to implement acts for specifying and carrying out policy actions that address fallback situations.

In various embodiments, any combinations of any of the above can be organized to perform any variation of acts that implement policy-based routing with fallback action options, and many such combinations of aspects of the above elements are contemplated.

Further details of aspects, objectives and advantages of the technological embodiments are described herein and in the figures and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
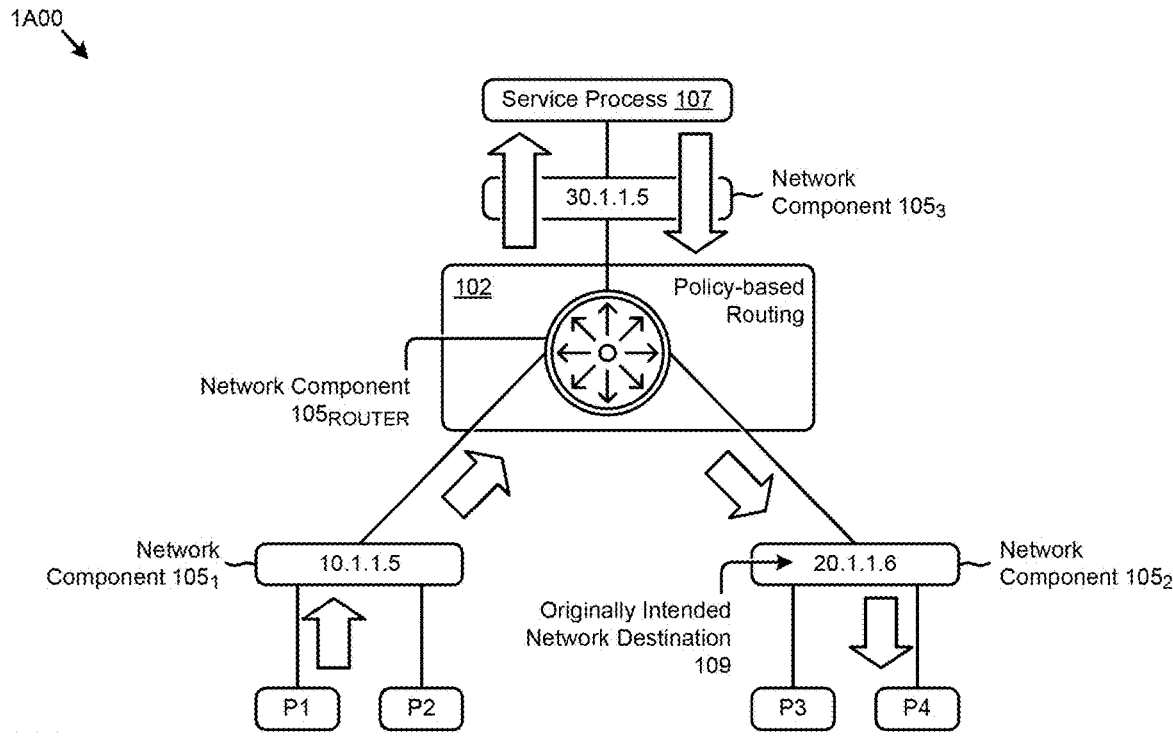
FIG. 1A shows an environment in which various techniques that implement policy-based routing with fallback action options can be practiced.

Aspects of the present disclosure solve problems associated with using computer systems in the face of a dearth of policy action options when specifying policy-based routing actions. These problems are unique to, and may have been created by, implementations of legacy policy-based routing (PBR) in a policy-based routing regime. Some embodiments are directed to approaches for specifying and carrying out policy actions that address fallback situations. The accompanying figures and discussions herein present example environments, systems, methods, and computer program products that implement policy-based routing with fallback action options.

Overview

As heretofore described, legacy policy-based routing (PBR) is deficient, at least in that merely dropping packets due to the unavailability of the computing element associated with the alternate destination does not fit all situations. For example, consider the situation where the computing element at the alternate destination of a PBR policy is an observer/logging service. Although it is very convenient (e.g., by merely defining a PBR policy) to route traffic to the observer/logging service, having a high-fidelity, 100% accurate record of observations (e.g., a log), it can happen that the observer/logging service might go down or become unavailable. In this situation, a network administrator might prefer to have the option to deactivate the PBR rerouting policy. In another situation, a network administrator might prefer to have the option to drop the packet immediately rather than subjecting the router to the task of monitoring the state of the packet until there is a timeout.

The foregoing observer/logging service is merely one example where a service is inserted into the packet path. Other services are possible. It should be noted that the particular policy action that should be taken (e.g., to drop a packet, to forward a packet, to re-route a packet, etc.) might be dependent on the functionality of the inserted service. Moreover, the particular policy action that should be taken might be dependent on the functionality of the computing infrastructure as a whole, or the particular policy action that should be taken might be dependent on the architecture or mode of the computing infrastructure. Therefore, what is needed is a generalized capability that allows the users of the computing infrastructure to define the behavior of traffic flow when access to a particular inserted service is interrupted (e.g., unreachable), and/or when the particular inserted service is deemed to be down. The figures and corresponding written descriptions show and discuss techniques for configuring fallback action options that control packet routing paths in cases when the inserted service is down or unreachable.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiment even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A shows an environment in which various techniques that implement policy-based routing with fallback action options can be practiced. As an option, one or more variations of environment 1A00 or any aspect thereof may be implemented in the context of the architecture and functionality of the embodiments described herein and/or in any environment.

The figure is being presented to illustrate how policy-based routing (PBR) can be implemented for and by and between network components. More particularly, the figure is being presented to illustrate the role of a router (e.g., network component $105_{ROUTER}$) in a computing infrastructure.

The shown computing infrastructure includes interrelated processes (e.g., process P1, process P2, process P3, process P4) and service process 107 that carry out inter-process network communications using any number of hardware network components (e.g., network component 1051, network component 1052, and network component 1053). Strictly as an example, process P1 might use a respective NIC (e.g., network component 1051) to communicate with process P4, which in turn uses its respective NIC (e.g., network component 1052). To do so using well-known packet switching protocols (e.g., Internet protocol (IP), transport control protocol (TCP), user datagram protocol (UDP), etc.), a router is involved in the network communications. Such a router (e.g., network component $105_{ROUTER}$) is able to inspect IP packets so as to identify an intended network destination address for the packet.

Referring again to communications from process P1 to process P4, a packet generated by process P1 might codify the source address of a packet using dotted-quad addressing as in 10.1.1.5, and similarly, the packet generated by process P1 might codify the destination address of the packet using dotted-quad addressing as in 20.1.1.6. A PBR policy corresponding to the herein-disclosed policy-based routing can use any syntax. For example, one way to codify a PBR policy involves the following syntax: "source==10.1.1.5", "destination==20.1.1.6", and "reroute==30.1.1.5". Additionally or alternatively, a PBR policy might specify an entire subnet as being subject to PBR. For example, a PBR policy might be codified as, "[any] source==10.1.1.0/24", "[any] destination==20.1.1.0/24", and "reroute via 30.1.1.5". Alternatively or additionally wildcard characters (e.g., the asterisk character "*") might be supported as in, "source==10.1.1.0/*", "destination==20.1.1.0/*", and "reroute via 30.1.1.5".

PBR Checks

When a packet hits the router—assuming for this illustrative example that the router implements policy-based routing—the router will check to see if any policies apply to the packet. If not, then the packet is routed to its originally intended network destination 109, namely IP address 20.1.1.6. However, when the router checks to see if any policies apply to the packet, if there is a policy that applies, then a policy record is examined to determine a routing action. When making a determination as to whether or not a rule applies to a packet, the rule can be applied over the entire subnet(s) of source and destination. In this case, the subnet of the source is 10.1.1.0/24 and the subnet of destination is 20.1.1.0/24.

Consistent with the aforementioned goal of policy-based routing, namely, to make the network as agile as possible by defining a routing action based on application attributes, the routing action might be to forward the packet to service process 107. Continuing with this example, suppose that the service process is a logging facility, where the logging facility is configured to (1) receive a packet, (2) log the occurrence of the packet arriving and any other information pertaining to the packet and/or its environment (e.g., make a timestamp), then (3) forward the packet to its originally intended network destination. Any technique (e.g., encapsulation) can be used to create a record of the IP address corresponding to the originally intended network destination.

The logging facility reinjects the packet into the routing fabric in a manner such that the packet is routed to its originally intended network destination. This is shown in FIG. 1A as originally intended network destination 109 (20.1.1.6), which is the IP address of network component 1052. The packet ends up in a location that is accessible by process P4, and process P4 in turn acts on the packet.

The foregoing example illustrates merely one possible routing scenario involving policy-based routing 102. However, the scenario shown and discussed heretofore in FIG. 1A does not include any consideration for policies that are aware of the operational capabilities of the involved network components and/or any consideration for policies that are aware of the operational capabilities of processes that rely on said network components. What is needed is a parameter, or data structure, or other facility for a router to be able to (1) determine that an alternate destination or service process (e.g., a network component or a computing process) is down or unreachable and (2) fall back to one or more actions based on the determination that an intended destination is down or unreachable. This deficiency can be remediated through use of a fallback action option specifications in a policy.

Remediation through use of fallback action option specifications in a routing policy involves three primary functions: (1) determine that there is indeed a demand for fallback processing, (2) lookup or otherwise determine what action to take in a corresponding fallback processing situation, and (3) initiate fall back processing based on one or more actions that are specified in the policy.

In somewhat more detail, determination that there is indeed a demand for fallback processing may involve (1) awareness of the operational viability of network components and/or (2) awareness of operational viability of processes that are associated with said network components.

Many techniques to implement such awarenesses are possible. Moreover many different environments admit of many different policy-based fallback routing capabilities.

Strictly for purposes of illustration of policy-based fallback routing scenarios, consider the situation where the inserted service is a non-critical service (e.g., a logging service or a telemetry service). When the inserted service is deemed to be non-critical, then a user might prefer that ongoing packet traffic is merely (1) dropped or (2) allowed to be routed to the originally intended destination. On the other hand, if the service is deemed to be critical, for example, because the service is providing all or a subset of functions of a firewall service, then the user would want all ongoing packet traffic to be dealt with in some secure manner in spite of the determination that the operational capability of the inserted service is deemed to be at least partially compromised. As an example, if the service is deemed to be critical, then the user might want the traffic to be dealt with by routing the traffic to a different (e.g., not down or unreachable) service process, or the user might want the traffic to be dealt with by ignoring (e.g., dropping) the traffic.

Accordingly, there are many different ways to configure a network routing component in a given computing environment so as to implement policy-based fallback routing. An example computing environment, together with an example implementation of policy-based fallback routing is shown and described as pertains to the following routing scenario.

Figure 1B:
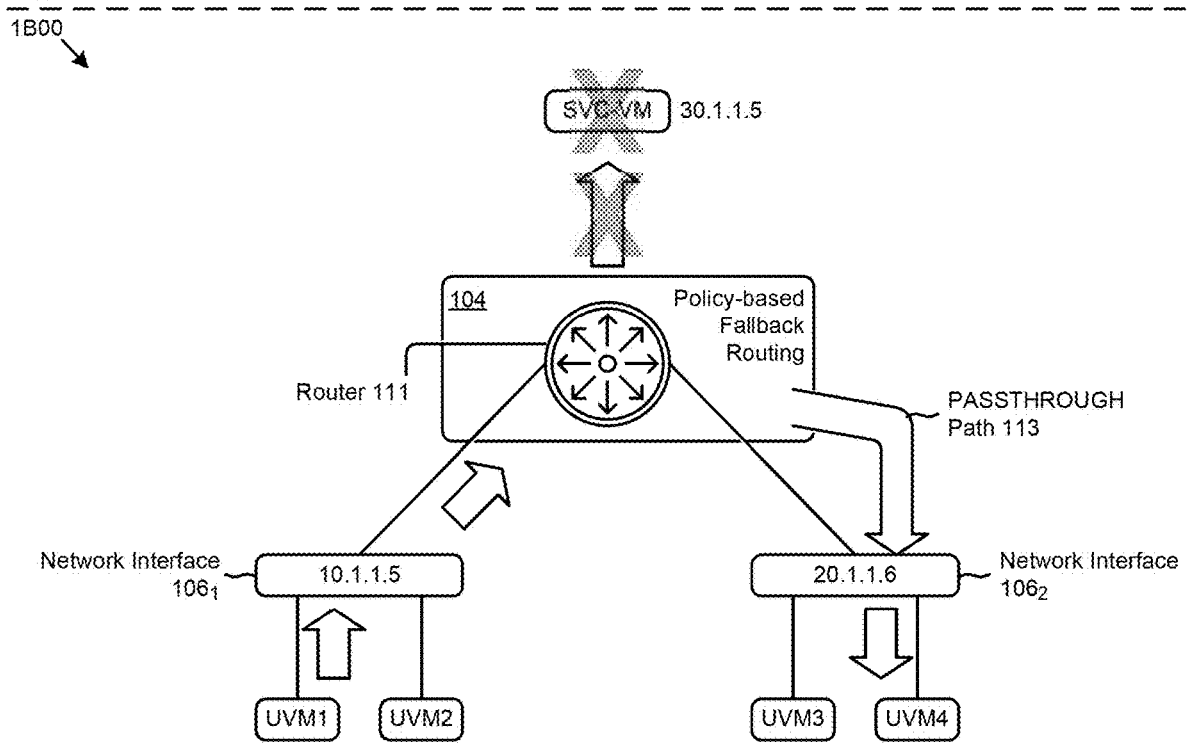
FIG. 1B shows a routing scenario that exemplifies the PASSTHROUGH fallback action options specification, according to an embodiment.

FIG. 1B shows a routing scenario that exemplifies the PASSTHROUGH fallback action specification. As an option, one or more variations of routing scenario 1B00 or any aspect thereof may be implemented in the context of the architecture and functionality of the embodiments described herein and/or in any environment.

The figure is being presented to illustrate how a router that implements policy-based fallback routing can be implemented and configured in any environment. This illustrative routing scenario involves a virtualization system where a first user virtual machine (e.g., UVM1) communicates with a second user virtual machine (e.g., UVM4) using packet switching over the shown network components. This illustrative routing scenario further involves a service that is implemented as a virtual machine (e.g., SVC-VM 30.1.1.5). The shown policy-based fallback routing 104 can be implemented in software or in hardware, or in any combination of hardware and software. Moreover, the shown policy-based fallback routing 104 can be situated between user virtual machines (UVMs) and a service virtual machine (SVC-VM). In further detail, any implementation of policy-based fallback routing 104 can be situated between virtual network interfaces that are associated with virtual machines (e.g., network interface 1061 and network interface 1062) and the virtual network interfaces that are associated with service virtual machines (SVC-VMs). The network interfaces that are associated with virtual machines can be implemented in software or in hardware, or in any combination of hardware and software.

An illustrative example of the functioning of policy-based fallback routing is now briefly described. Suppose that a service virtual machine (e.g., SVC-VM 30.1.1.5) is configured into this environment (e.g., as shown) and further suppose that the function of this inserted service virtual machine is to log the occurrence of traffic going into network interface 1062. In this configuration, then if a packet reaches router 111, and if the router is configured recognize and reroute the occurrence of traffic going into network interface 1062, instead of routing the packet to the originally intended destination (e.g., UVM4), the packet would be handled such that it is rerouted to the inserted service virtual machine.

Now, suppose that the router is able to determine that a particular inserted service virtual machine (e.g., SVC-VM) is down or unreachable. In this situation, rather than processing the packet in futility, if the policy-based fallback routing is configured, then the router can route the packet in accordance with the shown PASSTHROUGH path 113. The foregoing is merely one example where the policy-based routing can be augmented to be aware of the health (e.g., e.g., operational capability) and reachability of a service facility (e.g., SVC-VM). If a policy-based fallback routing is configured, and given the foregoing awareness that the service virtual machine is down or unreachable, then the packet can be routed via PASSTHROUGH path 113, ultimately reaching UVM4.

The foregoing written description pertains to merely one possible embodiment and/or one routing scenario. Many variations are possible. For example, a different routing scenario might involve only legacy policy-based routing and/or a different routing scenario might involve legacy PBR in combination with policy-based fallback routing. To further explain, FIG. 2A is presented to explain policy configuration when using legacy PBR alone, and FIG. 2B is presented to explain policy configuration when augmenting legacy PBR to use the herein-disclosed policy-based fallback routing.

Figure 2A:
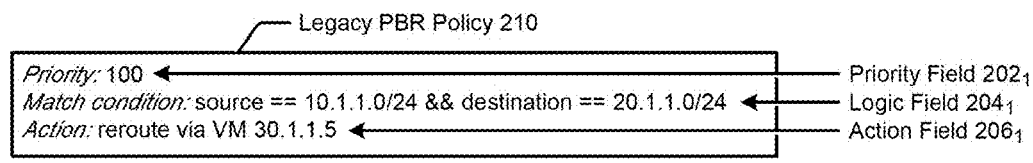
FIG. 2A shows a legacy PBR policy representation.
Figure 2B:
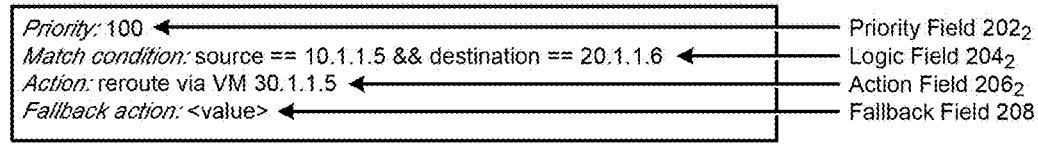
FIG. 2B shows an example fallback policy representation, according to an embodiment.

FIG. 2A shows a legacy PBR policy representation. As an option, one or more variations of legacy PBR policy representation 2A00 or any aspect thereof may be implemented in the context of the architecture and functionality of the embodiments described herein and/or in any environment.

The shown legacy PBR policy 210 includes a priority field $202_1$, a logic field $204_1$, and an action field $206_1$. These fields are used by legacy PBR as depicted in Table 1.

TABLE 1

Legacy PBR field synopsis

| Name | Semantics |
|---|---|
| Priority Field | Multiple legacy PBR policies may coexist in a legacy PBR configuration, and each legacy PBR policy may have a respective priority value. During legacy PBR routing, the multiple legacy PBR policies are considered, and the legacy PBR policy with the highest priority value is considered before any legacy PBR policies with a lower priority value. A particular legacy PBR policy might match then-current conditions, or it might not. In the latter case, a next legacy PBR policy with a lower priority value is considered, and so on. |
| Logic Field | A logical expression involving any aspect or aspects of a packet is evaluated. |
| Action Field | If the logical expression of the logic field evaluates to TRUE, then the action field of the policy is considered. If the logical expression evaluates to FALSE, then other legacy PBR policies of the same or lower priority value (if any) are considered. |

The example of FIG. 2A is merely an example and other fields and/or other values and/or other semantics are possible. Merely for purposes of illustration, however, this example depicts a priority field with a value of '100', a logic field with a match predicate involving a combination of a source IP subnet and a destination IP subnet, and an action field value involving a reroute to a particular IP address.

A legacy PBR policy 210 can be augmented to deal with situations where rerouting to a given particular rerouted destination IP address is ill advised, either because the functional capabilities of the service at the given rerouted destination IP address are deemed to be compromised or because the functioning of the network interface corresponding to the given rerouted destination IP address is deemed to be unreachable.

As used herein, the term "compromised" refers to a state of an inserted service or a network component when the inserted service network component is deemed to be less than fully functional, or when the inserted service is deemed to have been hacked or otherwise maliciously modified, or when the inserted service is deemed to be insufficiently authenticated, or when the inserted service is deemed to be insufficiently hardened for computer security.

The foregoing written description pertains to merely one possible embodiment and/or way to implement a legacy PBR policy representation; however, the capabilities of legacy PBR can be extended to include policy terms that are based on awareness of the health or reachability of a given reroute IP address. More particularly, legacy PBR policy representations can be augmented through use of fields corresponding to fallback policy semantics. One such augmentation involving a fallback action field is shown and described as pertains to FIG. 2B.

FIG. 2B shows an example fallback policy representation. As an option, one or more variations of fallback policy representation 2B00 or any aspect thereof may be implemented in the context of the architecture and functionality of the embodiments described herein and/or in any environment.

As shown, fallback policy representation 2B00 differs from legacy PBR policy representation 2A00 at least in that an additional field is present in the example fallback policy representation. In this specific example of FIG. 2B, the additional field is a fallback-aware policy action. In this embodiment, the fallback-aware policy action is codified directly in the policy (e.g., in fallback field 208). As can be seen by mere inspection, the other fields (e.g., priority field 2022, logic field 2042, and action field 2062) are the same as given in the example of FIG. 2A. Moreover, the semantics of the legacy PBR policy fields can be functionally the same (or identical) to the semantics as heretofore described as pertains to legacy PBR policy representation 2A00.

The semantics of fallback field 208 are extensive. Strictly as examples, the semantics of the various values in the fallback field can cover many actions that correspond to various fallback action options. Table 2 serves to explain a few possible values for fallback field action options.

TABLE 2

| Name | Semantics |
|---|---|
| | Fallback action field synopsis |
| PASSTHROUGH | When the rerouted destination (e.g., a rerouted IP address of a network interface or a rerouted IP address of a virtual machine) is deemed to be down or unreachable, then deactivate the current rule. Processing of rules may continue, and it is possible that different rules of the same priority and/or different rules of lower priorities may be considered by the policy-based fallback routing. In many cases, no rules are fired and the packet is routed to its originally intended destination. |
| DROP | When the rerouted destination (e.g., an rerouted IP address of a network interface or a rerouted IP address of a virtual machine) is deemed to be down or unreachable, then drop (e.g., do not forward) the current packet. |
| ALLOW | When the rerouted destination (e.g., an rerouted IP address of a network interface or a rerouted IP |

TABLE 2-continued

| Name | Semantics |
|---|---|
| | Fallback action field synopsis |
| | address of a virtual machine) is deemed to be down or unreachable, then nevertheless reroute the packet to the reroute IP address. |
| FORWARD | When the rerouted destination (e.g., a rerouted IP address of a network interface or a rerouted IP address of a virtual machine) is deemed to be down or unreachable, then route the packet to the IP address in the packet. |

As can be seen from the foregoing, policy-based fallback rerouting depends, at least in part, on a determination that the component at the reroute IP address is down or dysfunctional, or under some security scrutiny, or unreachable, or otherwise compromised. Accordingly, some technique or techniques that deal with such a determination as to whether or not a destination service is down or dysfunctional, or under some security scrutiny, or unreachable, or otherwise compromised needs to be implemented and enabled. One possible implementation is described in the flowchart of FIG. 3.

Figure 3:
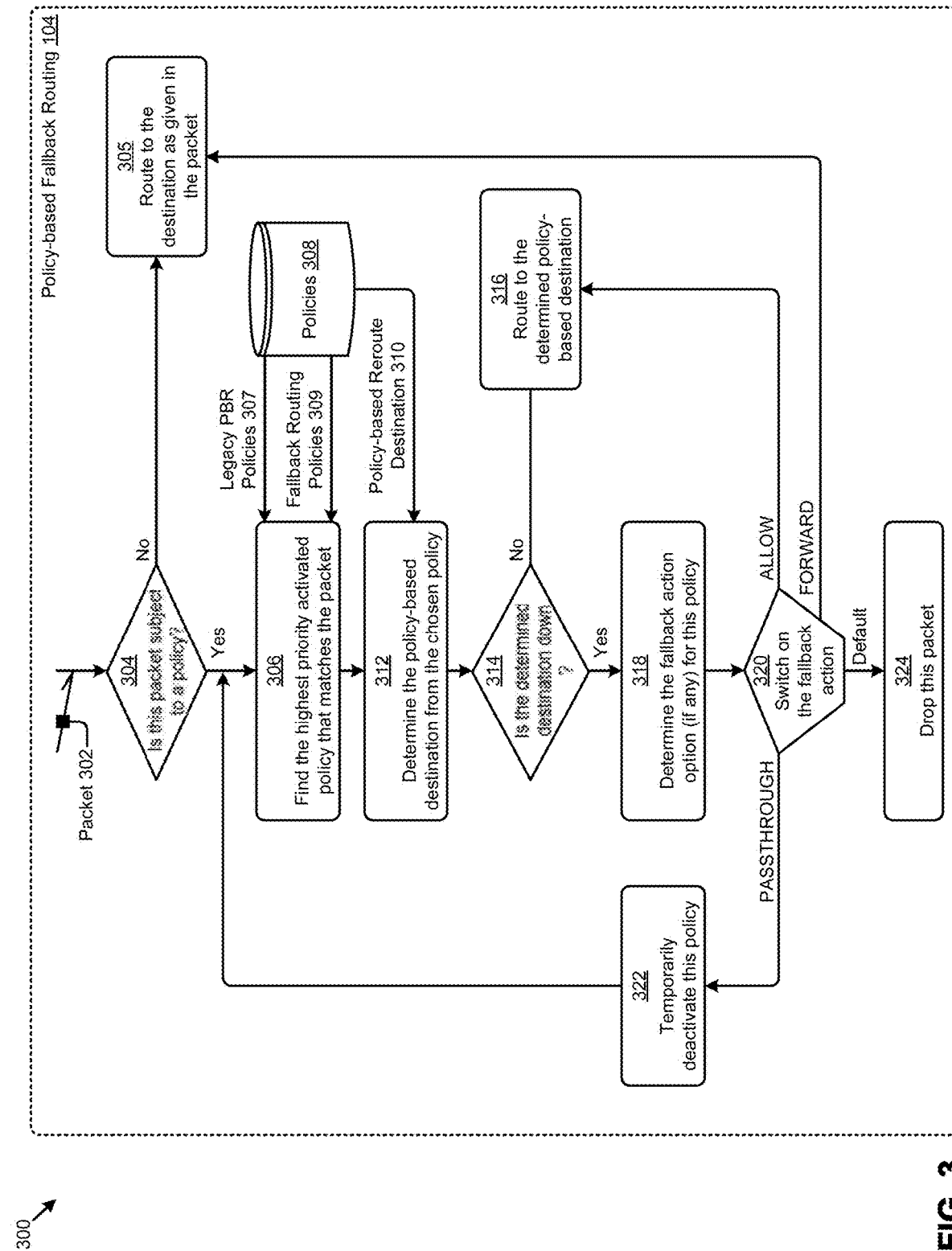
FIG. 3 is a flowchart for implementing a fallback policy routing algorithm that invokes a user-specified fallback action options when a destination service is down or unreachable, according to an embodiment.

FIG. 3 is a flowchart for implementing a fallback policy routing algorithm that invokes user-specified fallback action options when a destination service is down or unreachable. As an option, one or more variations of fallback policy routing algorithm 300 or any aspect thereof may be implemented in the context of the architecture and functionality of the embodiments described herein and/or in any environment.

As shown, the fallback policy routing algorithm is invoked upon receipt of a network packet (e.g., packet 302). A determination is made as to whether or not this packet is subject to any then-currently-in-force policies. Such a binary determination can be made using any known technique. In some cases, characteristics of the packet are considered with respect to any one or more policies. More particularly, characteristics of the packet are considered with respect to any logic field with a match predicate(s) that appears in any of the foregoing then-currently-in-force policies.

Regardless of the technique used to determine whether or not this packet is subject to any then-currently-in-force policies, and in the event that, after such a determination, the "No" branch of decision 304 is taken, the packet is routed (at step 305) to the destination as given in the packet. On the other hand, in the event that, after consideration, there is at least one fallback policy that applies to packet 302, then the "Yes" branch of decision 304 is taken and further processing is undertaken.

As previously indicated, there may be multiple policies that are then-currently-in-force and, as such, the fallback policy routing algorithm seeks to determine (at step 306) the highest priority policy. Such a determination can be informed by the content of any one or more policies 308. More particularly, the shown one or more policies 308 may include any number of legacy PBR policies 307 as well as any number of fallback routing policies 309. Once an applicable highest priority policy is identified, then the policy-based reroute destination 310 can be determined (at step 312) from the identified policy.

At this point (or earlier) in the flow, a determination is made (at decision 314) as to the health and reachability of the service at the policy-based reroute destination. If the service at the policy-based reroute destination is deemed to be functioning, or at least not deemed to be down and not deemed to be unreachable, then the "No" branch of decision 314 is taken and the packet is routed (at step 316) to the determined policy-based destination. On the other hand, if the service at the policy-based reroute destination is deemed to be compromised or unhealthy or down or unreachable, then the "Yes" branch of decision 314 is taken and a fallback action (if any) is determined (e.g., at step 318) To do so, the then-current policy (e.g., the policy as determined in the most recent pass through step 306) is accessed to determine the fallback action (if any) for this policy, then processing moves to switch 320.

Switch 320 serves to steer processing based on the fallback action. In the case when the fallback action is PASSTHROUGH, the PASSTHROUGH branch of switch 320 is taken and the current policy is temporarily deactivated (at step 322). There may be additional policies to be considered and, as such, processing is looped back to a place in the flow where step 306 is again invoked. As another possibility, in the case when the fallback action is ALLOW, the ALLOW branch of switch 320 is taken and the subject packet is allowed to be rerouted to the policy-based reroute destination (at step 316) in spite of the fact that the service corresponding to the policy-based reroute destination has been deemed to be compromised or down or unreachable. In yet a further possibility, in the case when the fallback action is FORWARD, the FORWARD branch of switch 320 is taken and the subject packet is allowed to be routed (at step 305) to the destination address as given in the subject packet, irrespective of any action (e.g., reroute) specified in the policy.

Still further, it can happen that the fallback action specified under policy-based fallback routing is DROP, or it can happen that the policy under consideration is a legacy PBR policy. In either case, switch 320 will fall through the "Default" branch of switch 320, which in turn will merely cause the packet to be dropped (at step 324).

As can be seen, branching operations of the fallback policy routing algorithm, specifically the branching operations of switch 320, steers execution through the fallback policy routing algorithm such that one of, a PASS-THROUGH fallback action, or an ALLOW fallback action, or a FORWARD fallback action, or a DROP fallback action is initiated when a component or function codified in the action field of the PBR policy is deemed to be compromised or down or unreachable.

The foregoing written description pertains to merely one possible embodiment and/or way to implement a fallback policy routing algorithm. Many variations are possible; for example, the fallback policy routing algorithm as comprehended in the foregoing can be implemented in any environment and/or in accordance with any of a variety of routing scenarios, examples of which are shown and described as pertains to FIG. 4A and FIG. 4B.

Figure 4A:
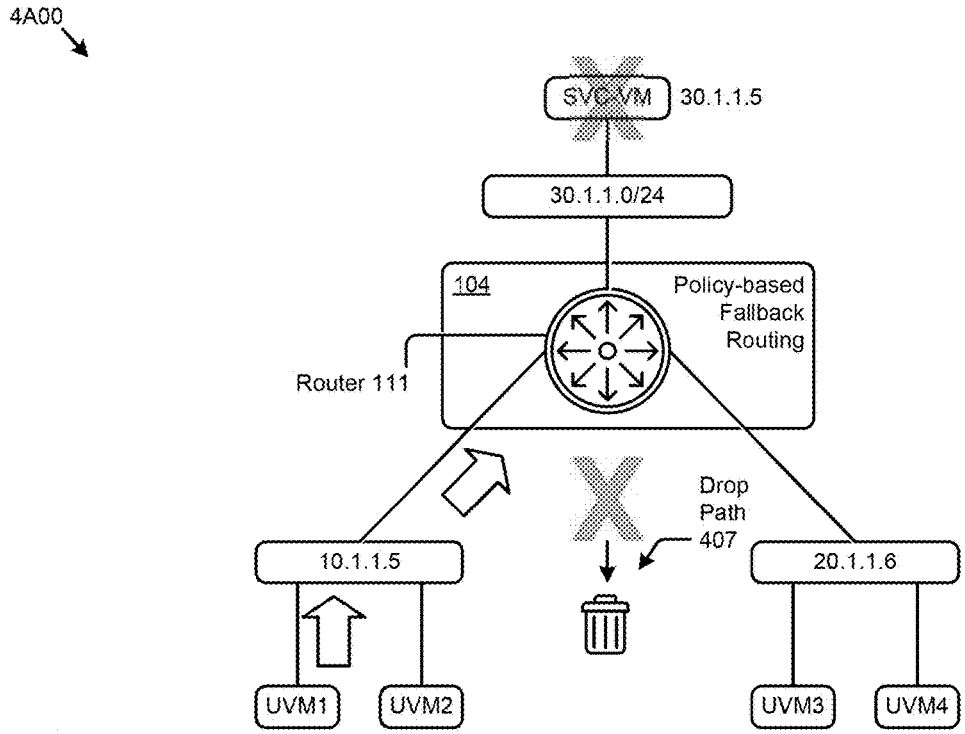
FIG. 4A shows a routing scenario that exemplifies the DROP fallback action options operation, according to an embodiment.

FIG. 4A shows a routing scenario that exemplifies the DROP fallback action operation. As an option, one or more variations of routing scenario 4A00 or any aspect thereof may be implemented in the context of the architecture and functionality of the embodiments described herein and/or in any environment.

As shown, drop path 407 is taken in accordance with the DROP fallback action when the inserted service SVC-VM 30.1.1.5 is deemed to be compromised or down or unreachable. In such a case, and assuming the subject router (e.g., router 111) implements policy-based fallback routing 104, then the packet sent by UVM1 to UVM4 never reaches UVM4.

There are other situations where the packet sent by UVM1 to UVM4 might or might not ever reach UVM4. Some such situations are shown and described as pertains to FIG. 4B.

Figure 4B:
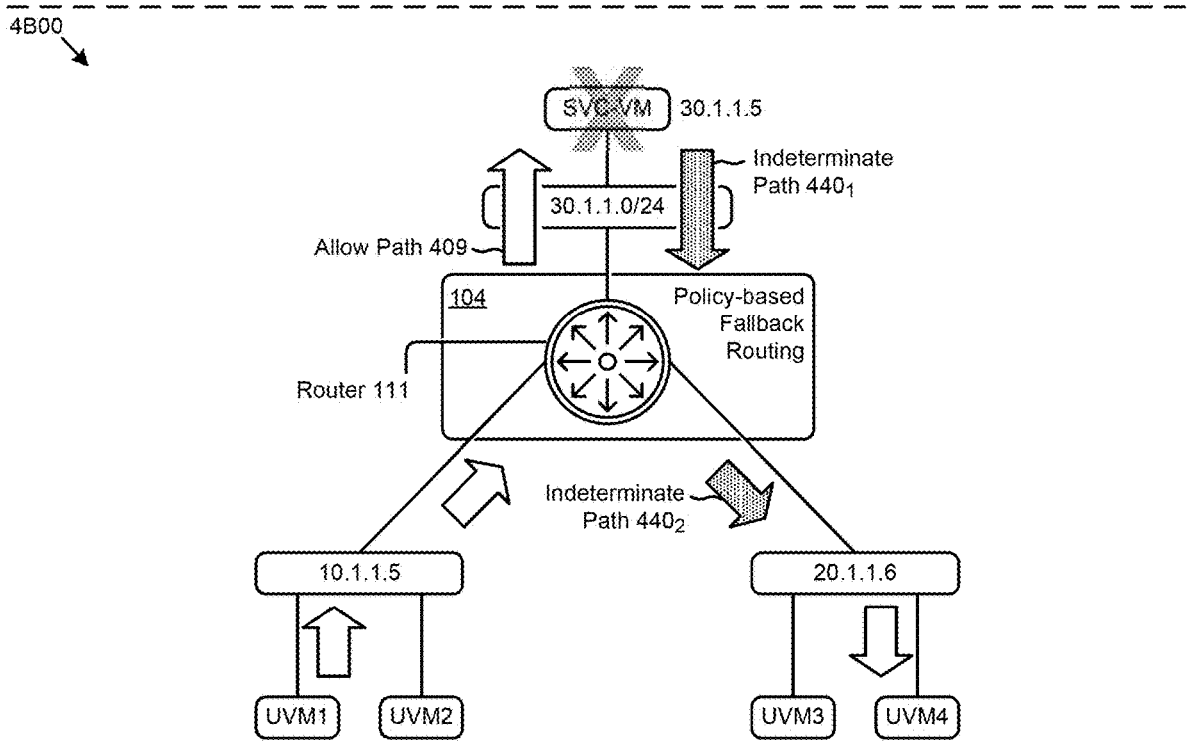
FIG. 4B shows a routing scenario that exemplifies the ALLOW fallback action options operation, according to an embodiment.

FIG. 4B shows a routing scenario that exemplifies the ALLOW fallback action operation. As an option, one or more variations of routing scenario 4B00 or any aspect thereof may be implemented in the context of the architecture and functionality of the embodiments described herein and/or in any environment.

The figure is being presented to illustrate how an ALLOW fallback action operation might be carried out. More specifically, this figure is being presented to illustrate the flexibility afforded by the ALLOW fallback action.

As is known by those of skill in the art, determining whether or not a service or interface is compromised or down or unreachable is not always foolproof. In some situations a service or interface might be deemed to be compromised or down or unreachable merely because of one momentary test or sampling event. It can sometimes happen that at the moment of the test or sampling event the network is only transiently busy or transiently unresponsive. There exists a certain class of inserted services where the need to provide the services is not optional, and/or where the need to provide such services outweighs the risk of adding further traffic or load to already oversubscribed resources. In such cases, a system administrator or computer-implemented agent might specify (e.g., using a computerized access and modification interface) an ALLOW fallback action operation. In some situations, a computer-implemented agent modifies fallback policies on the basis of any one or more then-current cluster-level and/or node-level and/or component-level health determinations.

Making then-Current Health Determinations

As is understood by those of skill in the art, a health determination can depend on metrics in many dimensions. Moreover, any one or more of a plurality of different health-related metrics are felicitously measured from correspondingly different locations in the computing cluster. For example, determination of a metric in a first dimension (e.g., loading of an inserted service relative to the capacity of the inserted service) might be conveniently done in a hypervisor, whereas determination of a metric in a second dimension (e.g., network-induced latency) might be conveniently done in a network controller. As such, some implementations deploy metric-gathering agents in both (1) each instance of a hypervisor, and (2) each instance of a network controller.

Irrespective of where such metric-gathering agents might be instanced, a given instance of a metric-gathering agent can be configured to monitor the health of at least some of the destinations that are codified into a PBR policy. In some computing architectures (e.g., multi-node architectures, clustered architectures), when a metric-gathering agent detects a change in status that would at least potentially affect the then-current configuration of any particular PBR policy, the agent notifies a master network controller (e.g., a centralized network controller).

Any known technique can be used to gather and/or publish health determinations. Moreover, any known technique can be used to implement actions taken in response to health determinations (e.g., an action to create a new PBR policy and/or an action to modify an existing PBR policy). In some cases a detected change in status of an inserted service, and/or a detected change in status of a network component that is on a network segment used in packet transmission to the inserted service, results in (e.g., triggers) generation of a newly-created PBR policy and/or results in (e.g., triggers) modification of any then existing PBR policies. As used in this context, foregoing generation of, and/or modification of, a PBR policy individually or collectively serve to specify one or more particular fallback actions. Such one or more fallback actions can then be implemented/ enforced for so long as the corresponding fallback actions are in force.

In any/all of the foregoing cases, the inserted service or interface that is deemed to be compromised or down or unreachable might only be compromised or down or unreachable for a brief moment in time. If the ALLOW fallback action operation is specified, then the allow path 409 is taken and any next actions responsive to the packet are left to the operation of the inserted service. In many situations, the inserted service might itself determine to drop the packet. In other situations, the inserted service might itself determine to never drop a packet, even if there is some infrastructure-incurred delay in receiving and/or processing the packet. One case where it is indeterminate as to whether or not the inserted service processes the packet or drops the packet is shown in FIG. 4B.

Specifically, the figure shows a first indeterminate path $440_1$ from the inserted service SVC-VM to router 111 as well as a second indeterminate path $440_2$ from router 111 to the originally intended destination UVM4. Whether or not a packet sent from UVM1 is ever delivered to the intended destination UVM4 is indeterminate at least because the determination as to how the packet is handled by the inserted service is left to operation of the inserted service itself.

The foregoing written description pertains to merely illustrative examples of ways to address the depicted routing scenarios. Many variations are possible; for example, the routing scenario as comprehended in the foregoing can be implemented in any environment, one example of which is shown and described as pertains FIG. 5.

Figure 5:
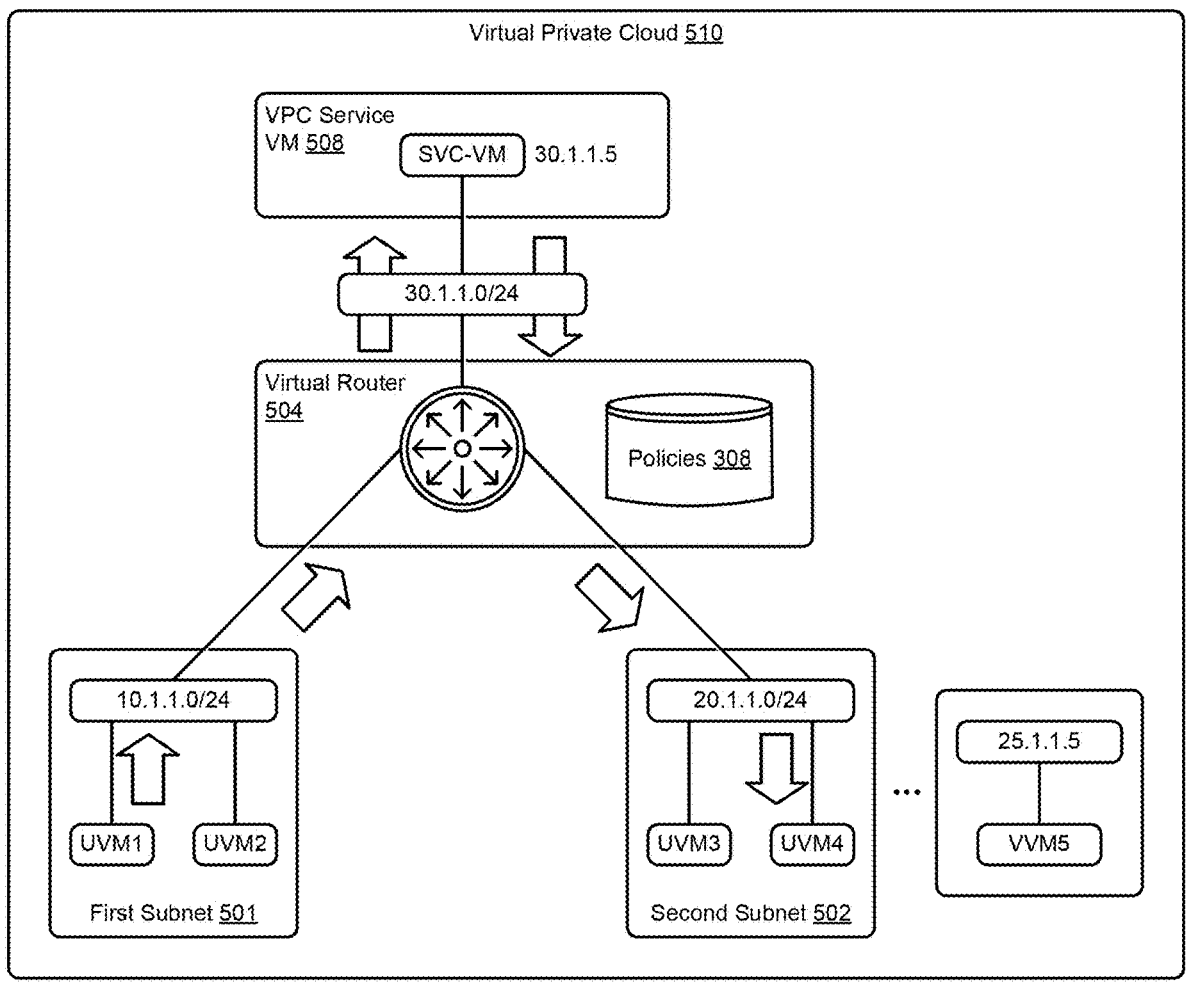
FIG. 5 shows a virtual private cloud implementation including a virtual router that implements routing based on fallback routing policies, according to an embodiment.

FIG. 5 shows a virtual private cloud implementation including a virtual router that implements routing based on fallback routing policies. As an option, one or more variations of virtual private cloud implementation 500 or any aspect thereof may be implemented in the context of the architecture and functionality of the embodiments described herein and/or in any environment.

The figure is being presented to illustrate how a virtual router 504 that is situated in a virtual private cloud 510 can handle traffic between UVMs and the shown VPC service VM 508. More specifically, the figure is being presented to illustrate how a virtual router 504 can be configured to comprehend any number of subnets (i.e., first subnet 501 and second subnet 502) for managing both incoming and outgoing traffic. In some cases a subnet, or more specifically, the networking infrastructure that is used to implement a subnet, is provided by a cloud provider.

Further details regarding general approaches to configuring subnets using cloud-provider infrastructure are described in U.S. Patent Application Publication. No. 2021/0067466 titled "VIRTUAL MACHINE MIGRATION IN CLOUD INFRASTRUCTURE NETWORKS" published on Mar. 4, 2021, which is hereby incorporated by reference in its entirety.

The figure includes a representation of a policy database, shown as policies 308. This policy database can include any of the foregoing policies, and different types of policies may be intermixed in any order. The shown priority field can be used to control which policy is evaluated first and which policy is evaluated next. One example of a partially-populated policy database is shown and described as pertains to FIG. 6.

Figure 6:
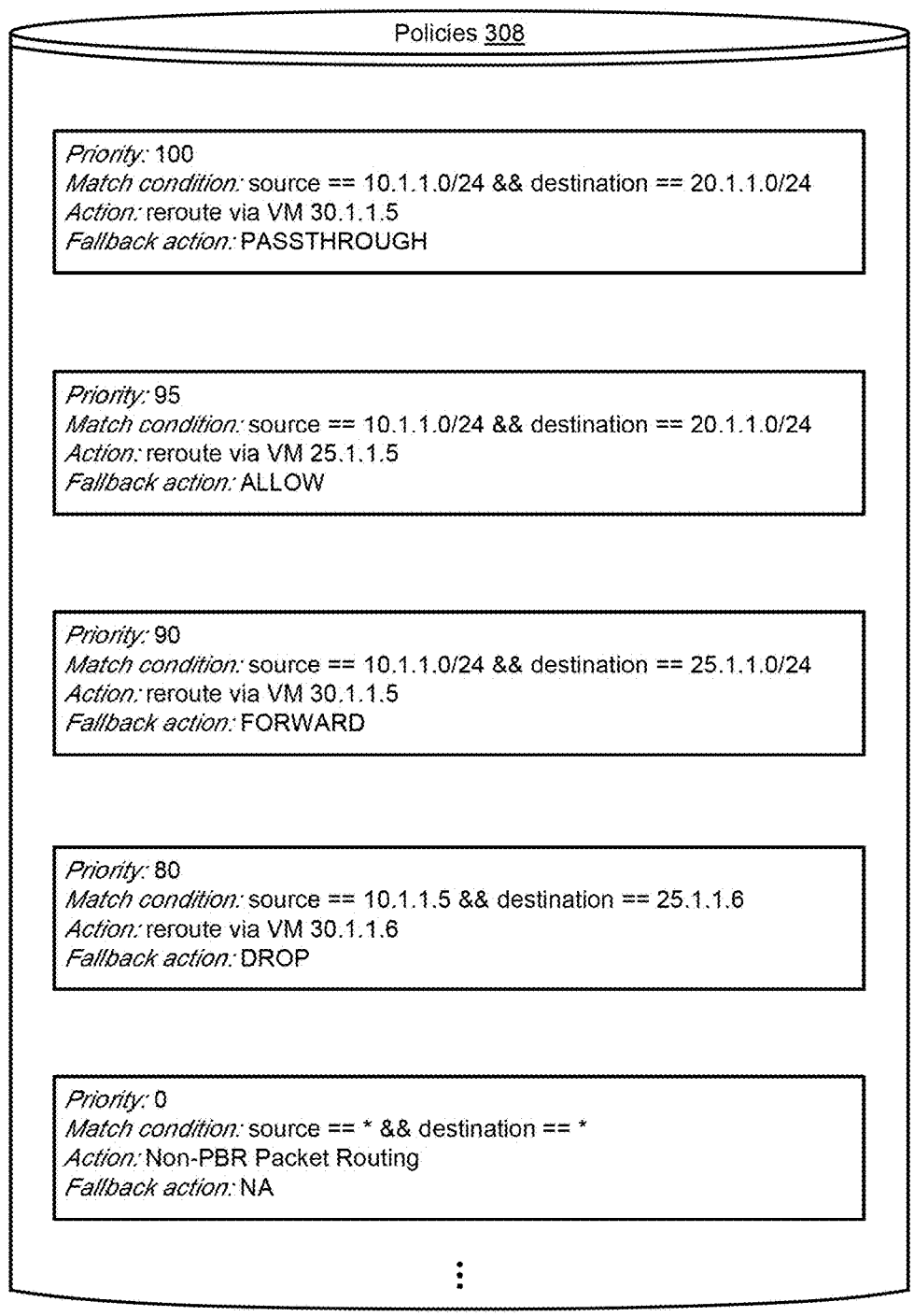
FIG. 6 shows a partially populated list of fallback priority policies as used in systems that implement policy-based routing with fallback action options, according to an embodiment.

FIG. 6 shows a partially populated list of fallback priority policies as used in systems that implement policy-based routing with fallback action options. As an option, one or more variations of partially populated list of fallback priority policies 600 or any aspect thereof may be implemented in the context of the architecture and functionality of the embodiments described herein and/or in any environment.

As previously mentioned, a PBR policy corresponding to the herein-disclosed policy-based routing can use any syntax. In the examples of FIG. 6, the value of the fallback action is specified using a reserved word, namely, PASS-THROUGH, ALLOW, DROP, and FORWARD. Furthermore, the priority field of the shown PBR policies are populated with integer values between 0 and 100, although any known technique for codifying a priority can be used.

The existence of and respective priority values of the shown fallback policies handles the case where, if VM 30.1.1.5 is down, then a lower priority policy is sought. In this case, there is a lower priority policy, specifically the policy with priority value="95". This policy specifies that even if the VM at 25.1.1.5 is deemed to be compromised or down or unreachable, the packet is nevertheless to be sent to the VM at 25.1.1.5. Strictly for illustration, FIG. 6 shows a priority=90 FORWARD policy and a priority=80 DROP policy as well as a Priority-0 policy. The shown Priority=0 policy uses asterisks as wildcard characters. Furthermore, the shown Priority-0 policy serves as a default policy in situations where none of the higher priority PBR policies correspond to (e.g., match against) a given subject packet. Note that, in this embodiment, if the PBR processing reaches this default policy, it implies that no higher priority policies corresponded to (e.g., matched against) the given subject packet, and as such, there is no policy-based rerouting specified for the given subject packet, which in turn implies that there is no meaning to fallback aware PBR for this policy. Accordingly, under the foregoing circumstances, non-PBR algorithms will handle the given subject packet.

The foregoing written description pertains to merely selected possible embodiments and/or ways to implement fallback policies. One such possible embodiment pertains to virtualization systems. More specifically, one such possible embodiment pertains to implementation of policy-based fallback routing as a function of a virtualized controller in virtual computing environments. An example architecture for implementing a virtualized controller in virtual computing environments is shown and discussed as pertains to FIG. 7A, FIG. 7B, FIG. 7C, FIG. 7D, and FIG. 7E.

System Architecture Over View

Figure 7A:
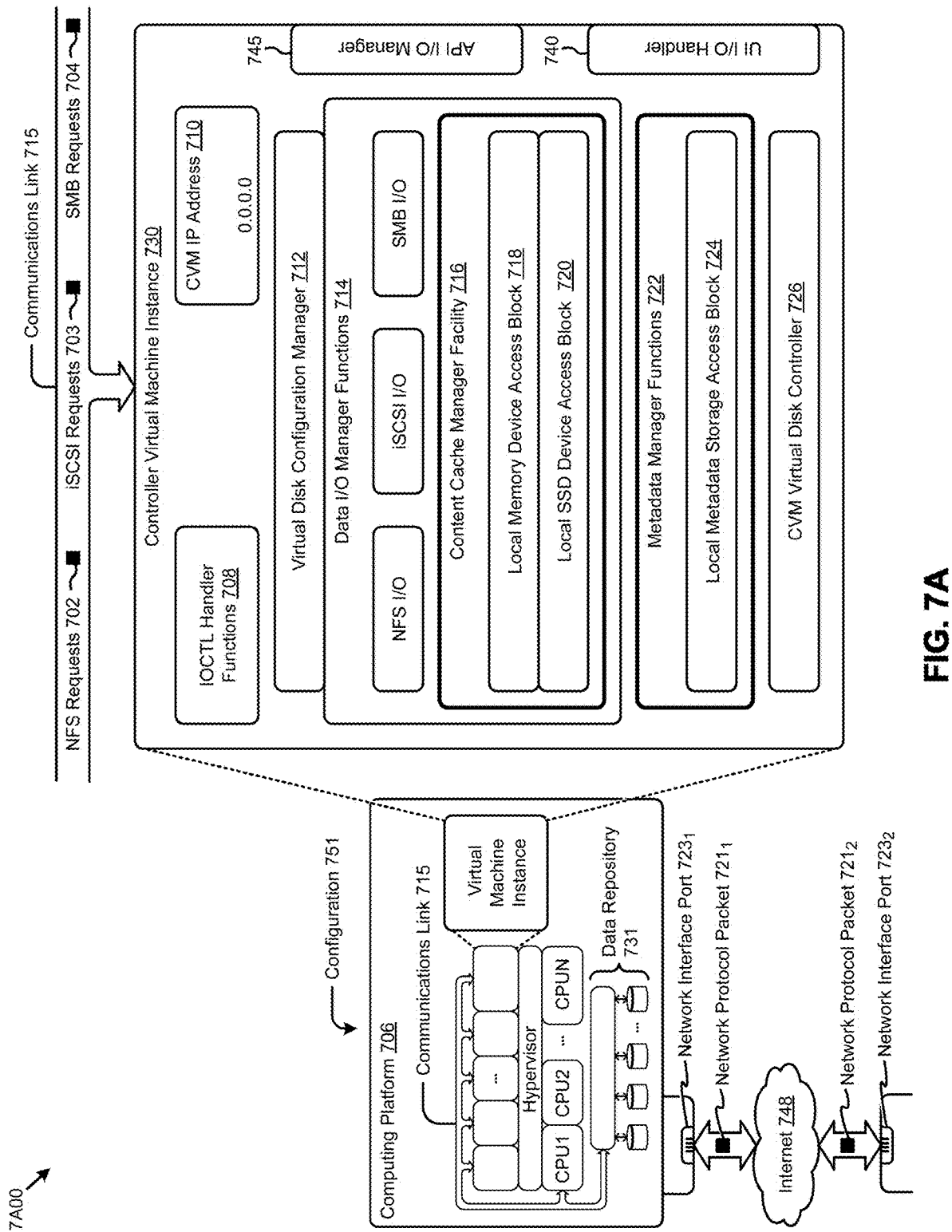
FIG. 7A, FIG. 7B, FIG. 7C, FIG. 7D, and FIG. 7E depict virtualization system architectures comprising collections of interconnected components suitable for implementing embodiments of the present disclosure and/or for use in the herein-described environments.

FIG. 7A depicts a virtualized controller as implemented in the shown virtual machine architecture 7A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines are configured for processing of storage inputs or outputs (I/O or IO or inputs/outputs) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer system interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control (IOCTL) handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports input or output (IO) of any form (e.g., block IO, streaming IO) and/or packet-based IO such as hypertext transport protocol (HTTP) traffic, etc., through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; compact disk read-only memory (CD-ROM) or any other optical medium; punch cards, paper tape, or any other physical medium with patterns of holes; or any random access memory (RAM), programmable read-only memory (PROM), erasable programmable read-only memory (EPROM), flash memory EPROM (FLASH-EPROM), or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a central processing unit (CPU) or data processor or graphics processing unit (GPU), or such as any type or instance of a processor (e.g., CPU1, CPU2, ..., CPUN). According to certain embodiments of the disclosure, two or more instances of configuration 751 can be coupled by communications link 715 (e.g., backplane, local area network, public switched telephone network, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port 7231 and network interface port 7232). Configuration 751 can be addressed through one or more network interface ports using an IP address. Any operational element within computing platform 706 can perform sending and receiving operations using any of a range of network protocols, possibly including network protocols that send and receive packets (e.g., network protocol packet 7211 and network protocol packet 7212).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (LAN) and/or through a virtual LAN (VLAN) and/or over a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to policy-based routing with fallback action options. In some embodiments, a module may include one or more state machines and/or combinational logic used to implement or facilitate the operational and/or performance characteristics pertaining to policy-based routing with fallback action options.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of policy-based routing with fallback action options). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to policy-based routing with fallback action options, and/or for improving the way data is manipulated when performing computerized operations pertaining to specifying and carrying-out policy actions that address fallback situations.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 7B:
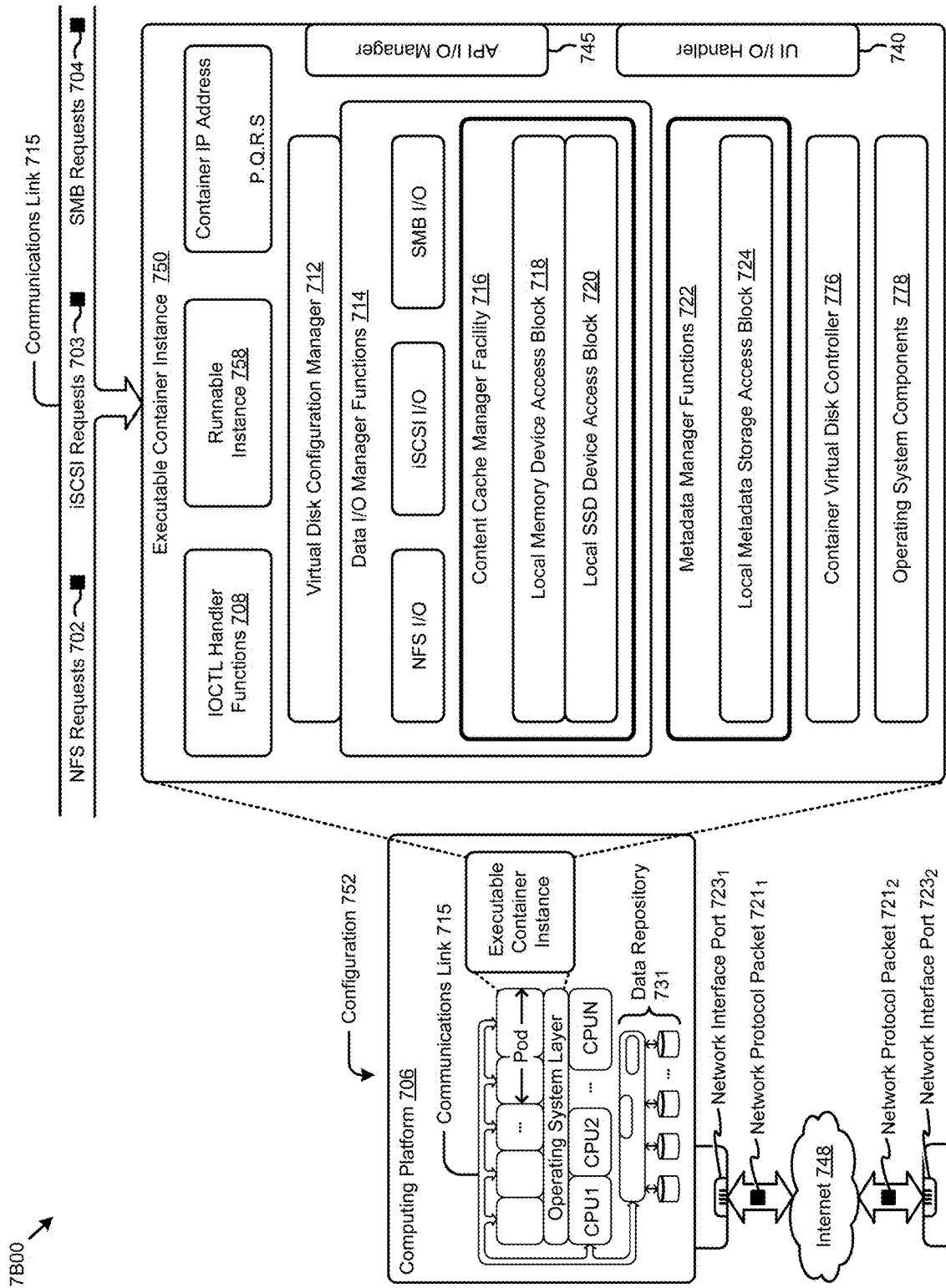

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification, possibly including the hypertext transport protocol (HTTP or "http:") and/or possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a corresponding virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include any or all of any or all library entries and/or operating system (OS) functions, and/or OS-like functions as may be needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
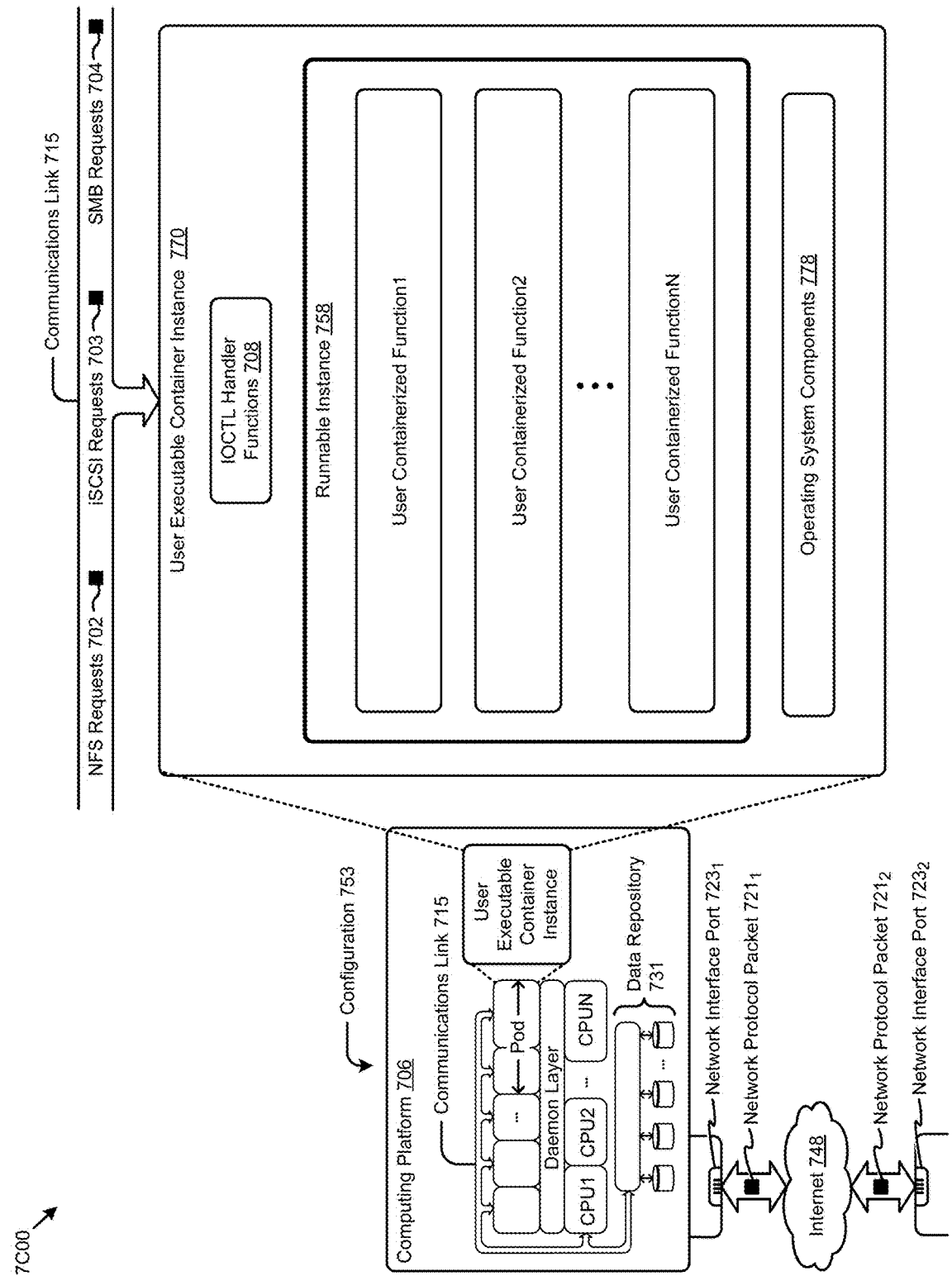

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 770. Configuration 753 includes a daemon layer (as shown) that performs certain functions of an operating system.

User executable container instance 770 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 770.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (NAS) and/or may include all or portions of a storage area network (SAN). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 7D:
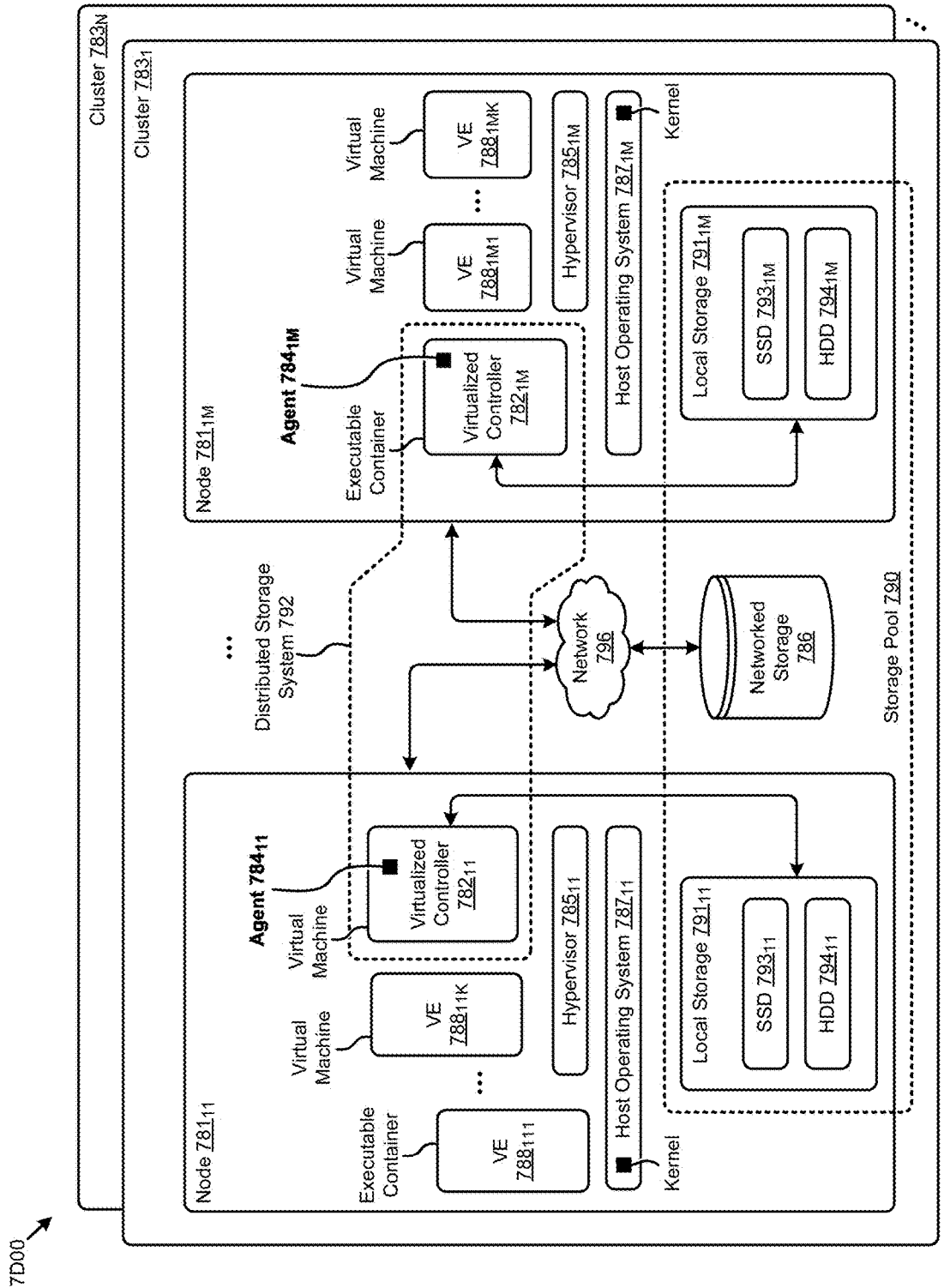

FIG. 7D depicts a distributed virtualization system in a multi-cluster environment 7D00. The shown distributed virtualization system is configured to be used to implement the herein disclosed techniques. Specifically, the distributed virtualization system of FIG. 7D comprises multiple clusters (e.g., cluster $783_1$, . . . , cluster $783_N$) comprising multiple nodes that have multiple tiers of storage in a storage pool. Representative nodes (e.g., node $781_{11}$, . . . , node $781_{1M}$) and storage pool 790 associated with cluster $783_1$ are shown. Each node can be associated with one server, multiple servers, or portions of a server. The nodes can be associated (e.g., logically and/or physically) with the clusters. As shown, the multiple tiers of storage include storage that is accessible through a network 796, such as a networked storage 786 (e.g., a storage area network or SAN, network attached storage or NAS, etc.). The multiple tiers of storage further include instances of local storage (e.g., local storage $791_{11}$, . . . , local storage 7911M). For example, the local storage can be within or directly attached to a server and/or appliance associated with the nodes. Such local storage can include solid state drives (SSD $793_{11}$, . . . , SSD $793_{1M}$), hard disk drives (HDD $794_{11}$, . . . , HDD $794_{1M}$), and/or other storage devices.

As shown, any of the nodes of the distributed virtualization system can implement one or more user virtualized entities (VEs) such as the virtualized entity (VE) instances shown as VE $788_{111}$, . . . , VE $788_{11K}$, . . . , VE $788_{1M1}$, . . . , VE $788_{1MK}$, and/or a distributed virtualization system can implement one or more virtualized entities that may be embodied as a virtual machines (VM) and/or as an executable container. The VEs can be characterized as software-based computing "machines" implemented in a container-based or hypervisor-assisted virtualization environment that emulates underlying hardware resources (e.g., CPU, memory, etc.) of the nodes. For example, multiple VMs can operate on one physical machine (e.g., node host computer) running a single host operating system (e.g., host operating system $787_{11}$, . . . , host operating system $787_{1M}$), while the VMs run multiple applications on various respective guest operating systems. Such flexibility can be facilitated at least in part by a hypervisor (e.g., hypervisor $785_{11}, \ldots,$ hypervisor $785_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers comprise groups of processes and/or may use resources (e.g., memory, CPU, disk, etc.) that are isolated from the node host computer and other containers. Such executable containers directly interface with the kernel of the host operating system (e.g., host operating system $787_{11}, \ldots,$ host operating system $787_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 790 by the VMs and/or the executable containers.

Multiple instances of such virtualized controllers can coordinate within a cluster to form the distributed storage system 792 which can, among other operations, manage the storage pool 790. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $781_{11}$ can interface with a controller virtual machine (e.g., virtualized controller $782_{11}$) through hypervisor $785_{11}$ to access data of storage pool 790. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 792. For example, a hypervisor at one node in the distributed storage system 792 might correspond to software from a first vendor, and a hypervisor at another node in the distributed storage system 792 might correspond to a second software vendor. As another virtualized controller implementation example, executable containers can be used to implement a virtualized controller (e.g., virtualized controller $782_{1M}$) in an operating system virtualization environment at a given node. In this case, for example, the virtualized entities at node $781_{1M}$ can access the storage pool 790 by interfacing with a controller container (e.g., virtualized controller $782_{1M}$) through hypervisor $785_{1M}$ and/or the kernel of host operating system $787_{1M}$.

In certain embodiments, one or more instances of an agent can be implemented in the distributed storage system 792 to facilitate the herein disclosed techniques. Specifically, agent $784_{11}$ can be implemented in the virtualized controller $782_{11}$, and agent $784_{1M}$ can be implemented in the virtualized controller $782_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Figure 7E:
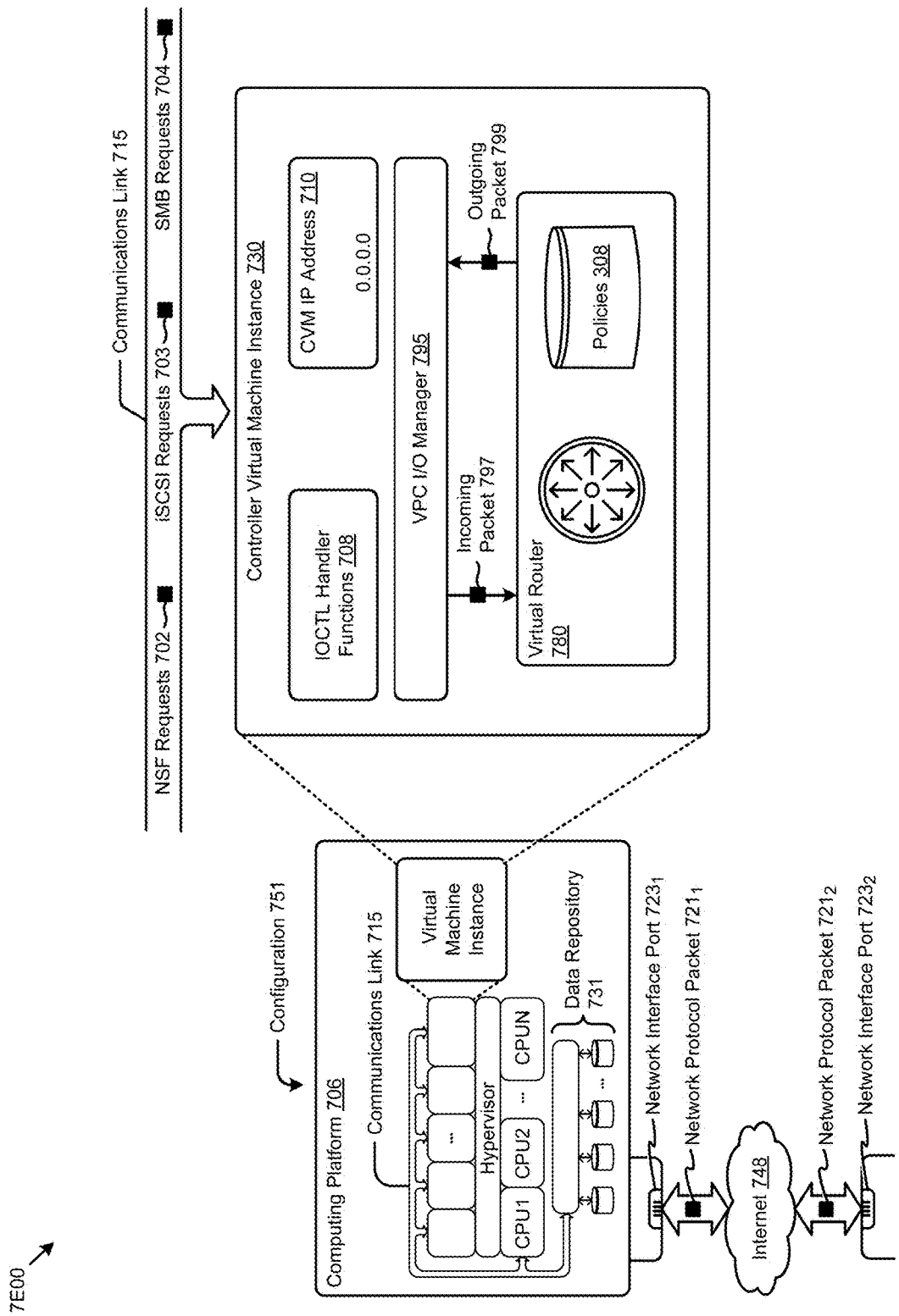

FIG. 7E depicts a virtualized controller as implemented in the shown virtual machine architecture 7E00. The heretofore-disclosed embodiments, including variations of any virtualized controllers, can be implemented in distributed systems where a plurality of networked-connected devices communicate and coordinate actions using intercomponent messaging.

As shown, a virtual private cloud I/O manager 795 can be implemented within a given controller virtual machine (e.g., controller virtual machine instance 730). Also shown is a fallback routing capability (e.g., embodied in virtual router 780). The functions and juxtaposition of the shown components facilitate ongoing processing of fallback action options. More specifically, the fallback routing capability can accept an incoming packet 797, consider the incoming packet with respect to any policies in the policy database, and emit an outgoing packet 799 that is addressed in accordance with the processing of the policies in the policy database.

Solutions attendant to specifying and carrying out policy actions that address fallback situations can be brought to bear through implementation of any one or more of the foregoing techniques. Moreover, any aspect or aspects of any implementation of policy actions in fallback situations can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts comprising:
    adding respective fallback-aware policy actions to policies defined in a policy-based routing regime; and
    observing fallback-aware policy action in a first policy matching a first packet when a first destination specified in the first policy is deemed to be compromised, down, or unreachable, wherein the fallback-aware policy action comprising temporarily disabling the first policy; and
    observing, after temporarily disabling the first policy, an action in a second policy matching the first packet when a second destination specified in the second policy is not deemed to be compromised, down, or unreachable, wherein the action comprise routing to a destination identified in the action of the second policy and the first policy is observed before the second policy is observed based on at least the first policy having a higher priority than the second policy.

2. The non-transitory computer readable medium of claim 1, wherein the destination specified in the second policy is an inserted service, and wherein the inserted service is at least one of, a service process, a service virtual machine, a hardware network component, or a virtual network interface.

3. The non-transitory computer readable medium of claim 2, wherein the inserted service implements at least one of, a logging service, a telemetry service, or a firewall service.

4. The non-transitory computer readable medium of claim 1, the policy specifies a policy-based reroute destination and wherein the fallback-aware policy action is one of, a PASS-THROUGH fallback action, an ALLOW fallback action, a FORWARD fallback action, or a DROP fallback action.

5. The non-transitory computer readable medium of claim 4, wherein, when the policy-based reroute destination is deemed to be down or unreachable, the PASSTHROUGH fallback action routes a packet to the destination specified in the packet rather than to the policy-based reroute destination.

6. The non-transitory computer readable medium of claim 4, wherein, when the policy-based reroute destination is deemed to be down or unreachable, the ALLOW fallback action routes a packet to the policy-based reroute destination rather than to the destination specified in the packet.

7. The non-transitory computer readable medium of claim 4, wherein, when the policy-based reroute destination is deemed to be down or unreachable, the DROP fallback action drops a packet rather than routing the packet to the policy-based reroute destination.

8. The non-transitory computer readable medium of claim 4, wherein, when the policy-based reroute destination is deemed to be down or unreachable, the FORWARD fallback action routes a packet to a destination address in the packet, rather than routing the packet to the policy-based reroute destination.

9. A method comprising:
adding respective fallback-aware policy actions to policies defined in a policy-based routing regime; and
observing fallback-aware policy action in a first policy matching a first packet when a first destination specified in the first policy is deemed to be compromised, down, or unreachable, wherein the fallback-aware policy action comprising temporarily disabling the first policy; and
observing, after temporarily disabling the first policy, an action in a second policy matching the first packet when a second destination specified in the second policy is not deemed to be compromised, down, or unreachable, wherein the action comprise routing to a destination identified in the action of the second policy and the first policy is observed before the second policy is observed based on at least the first policy having a higher priority than the second policy.

10. The method of claim 9, wherein the destination specified in the second policy is an inserted service, and wherein the inserted service is at least one of, a service process, a service virtual machine, a hardware network component, or a virtual network interface.

11. The method of claim 10, wherein the inserted service implements at least one of, a logging service, a telemetry service, or a firewall service.

12. The method of claim 9, the policy specifies a policy-based reroute destination and wherein the fallback-aware policy action is one of, a PASSTHROUGH fallback action, an ALLOW fallback action, a FORWARD fallback action, or a DROP fallback action.

13. The method of claim 12, wherein, when the policy-based reroute destination is deemed to be down or unreachable, the PASSTHROUGH fallback action routes a packet to the destination specified in the packet rather than to the policy-based reroute destination.

14. The method of claim 12, wherein, when the policy-based reroute destination is deemed to be down or unreachable, the ALLOW fallback action routes a packet to the policy-based reroute destination rather than to the destination specified in the packet.

15. The method of claim 12, wherein, when the policy-based reroute destination is deemed to be down or unreachable, the DROP fallback action drops a packet rather than routing the packet to the policy-based reroute destination.

16. The method of claim 12, wherein, when the policy-based reroute destination is deemed to be down or unreachable, the FORWARD fallback action routes a packet to a destination address in the packet, rather than routing the packet to the policy-based reroute destination.

17. A system comprising:
a storage medium having stored thereon a sequence of instructions; and
a processor that executes the sequence of instructions to cause the processor to perform acts comprising,
adding respective fallback-aware policy actions to policies defined in a policy-based routing regime; and
observing fallback-aware policy action in a first policy matching a first packet when a first destination specified in the first policy is deemed to be compromised, down, or unreachable, wherein the fallback-aware policy action comprising temporarily disabling the first policy; and
observing, after temporarily disabling the first policy, an action in a second policy matching the first packet when a second destination specified in the second policy is not deemed to be compromised, down, or unreachable, wherein the action comprise routing to a destination identified in the action of the second policy and the first policy is observed before the second policy is observed based on at least the first policy having a higher priority than the second policy.

18. The system of claim 17, wherein the destination specified in the second policy is an inserted service, and wherein the inserted service is at least one of, a service process, a service virtual machine, a hardware network component, or a virtual network interface.

19. The system of claim 18, wherein the inserted service implements at least one of, a logging service, a telemetry service, or a firewall service.

20. The system of claim 17, the policy specifies a policy-based reroute destination and wherein the fallback-aware policy action is one of, a PASSTHROUGH fallback action, an ALLOW fallback action, a FORWARD fallback action, or a DROP fallback action.

21. The system of claim 20, wherein, when the policy-based reroute destination is deemed to be down or unreachable, the PASSTHROUGH fallback action routes a packet to the destination specified in the packet rather than to the policy-based reroute destination.

22. The system of claim 20, wherein, when the policy-based reroute destination is deemed to be down or unreachable, the ALLOW fallback action routes a packet to the policy-based reroute destination rather than to the destination specified in the packet.

23. The system of claim 20, wherein, when the policy-based reroute destination is deemed to be down or unreachable, the DROP fallback action drops a packet rather than routing the packet to the policy-based reroute destination.

24. The system of claim 20, wherein, when the policy-based reroute destination is deemed to be down or unreachable, the FORWARD fallback action routes a packet to a destination address in the packet, rather than routing the packet to the policy-based reroute destination.

\* \* \* \* \*